(12) United States Patent  (10) Patent No.: US 8,727,549 B2
Farell  (45) Date of Patent: May 20, 2014

(54) RADAR EFFECT SYSTEM AND METHOD FOR INSTRUMENT CLUSTER GAUGE

(75) Inventor: James P. Farell, Canton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 0 days.

(21) Appl. No.: 13/588,401

(22) Filed: Aug. 17, 2012

(65) Prior Publication Data

US 2014/0049938 A1    Feb. 20, 2014

(51) Int. Cl.
*G01K 1/06* (2006.01)
*G01D 11/28* (2006.01)
*F01P 11/16* (2006.01)

(52) U.S. Cl.
USPC .......... 362/23.07; 362/23.08; 362/23.09; 362/23.01

(58) Field of Classification Search
None
See application file for complete search history.

(56) References Cited

U.S. PATENT DOCUMENTS

| | | | |
|---|---|---|---|
| 2,721,808 A | 10/1955 | Roberts et al. | |
| 2,858,632 A | 11/1958 | Caserio et al. | |
| 3,219,008 A | 11/1965 | Harris et al. | |
| 3,776,176 A | 12/1973 | Doyle | |
| 4,860,170 A | 8/1989 | Sakakibara et al. | |
| 4,882,659 A | 11/1989 | Gloudemans | |
| 4,959,759 A | 9/1990 | Kohler | |
| 4,970,400 A | 11/1990 | Muramatsu | |
| 5,319,527 A | 6/1994 | Murphy et al. | |
| 5,607,222 A | 3/1997 | Woog | |
| 5,920,150 A | 7/1999 | Crary et al. | |
| 5,997,161 A | 12/1999 | Stringfellow et al. | |
| 6,379,015 B2 | 4/2002 | Wilhelm et al. | |
| 6,990,922 B2 | 1/2006 | Ichikawa et al. | |
| 7,665,413 B2 | 2/2010 | Birman et al. | |
| 8,125,346 B2 * | 2/2012 | Ballard et al. | 340/688 |
| 8,261,686 B2 * | 9/2012 | Birman et al. | 116/286 |
| 2006/0072005 A1 * | 4/2006 | Thomas-Wayne | 348/50 |
| 2008/0202408 A1 | 8/2008 | Takato | |
| 2009/0272313 A1 | 11/2009 | Ballard et al. | |
| 2010/0064962 A1 | 3/2010 | Birman et al. | |

* cited by examiner

*Primary Examiner* — Natalie Walford
(74) *Attorney, Agent, or Firm* — Klintworth & Rozenblat IP LLC

(57) ABSTRACT

A lighting system includes a display, a pointer, a motor, a lighting element, a lens, and a coating. The display has first and second opposed sides, with the pointer at least partially disposed on the first opposed side of the display, and the motor disposed on the second opposed side of the display for moving the pointer. The lighting element disposed within the motor on the second opposed side of the display lights the pointer. The lens is disposed on the first opposed side of the display with the pointer at least partially disposed between the first opposed side of the display and the lens. The coating, disposed on an underside of the lens facing the pointer and the display, is made of a material which when excited by light emits light onto the display creating a shadow of at least a portion of the pointer on the display.

20 Claims, 3 Drawing Sheets

US 8,727,549 B2

RADAR EFFECT SYSTEM AND METHOD FOR INSTRUMENT CLUSTER GAUGE

FIELD OF THE DISCLOSURE

This disclosure relates to a system and method for providing a ghosting shadow effect on a display for a moving pointer of an instrument such as an analog instrument cluster gauge of a vehicle.

BACKGROUND

Some consumers find it aesthetically desirable for a pointer of an instrument, such as an analog instrument cluster gauge of a vehicle, to replicate the look of old fashioned radar in which there is a trailing light behind the pointer referred to as a ghosting effect. Some prior systems and methods have accomplished this through the use of disc segments that are lit and rotated underneath the pointer. However, this adds significant expense to the manufacture of the system and increases the likelihood of the system breaking down.

A system and method is needed to overcome one or more issues of one or more of the prior systems and methods.

SUMMARY

In one embodiment, a lighting system includes a display, a pointer, a motor, a lighting element, a lens, and a coating. The display has first and second opposed sides. The pointer is at least partially disposed on the first opposed side of the display. The motor is disposed on the second opposed side of the display for moving the pointer. The lighting element is disposed within the motor on the second opposed side of the display for lighting the pointer. The lens is disposed on the first opposed side of the display with the pointer at least partially disposed between the first opposed side of the display and the lens. The coating is disposed on an underside of the lens facing the pointer and the display. The coating is made of a material which when excited by light emits light onto the display creating a shadow of at least a portion of the pointer on the display.

In another embodiment, a vehicle instrument lighting system includes a vehicle gauge display, a pointer, a shaftless stepper motor, a lighting element, a lens, and a coating. The vehicle gauge display includes first and second opposed sides. The pointer is at least partially disposed on the first opposed side of the vehicle gauge display. The shaftless stepper motor is disposed on the second opposed side of the vehicle gauge display and is attached to the pointer for moving the pointer. The lighting element is disposed within the shaftless stepper motor on the second opposed side of the vehicle gauge display for lighting the pointer. The lens is disposed on the first opposed side of the vehicle gauge display with the pointer at least partially disposed between the first opposed side of the vehicle gauge display and the lens. The coating is disposed on an underside of the lens facing the pointer and the vehicle gauge display. The coating is made of a material which when excited by light emits light onto the vehicle gauge display creating a shadow of at least a portion of the pointer on the vehicle gauge display In still another embodiment, a method of lighting a display is disclosed. In one step, a pointer, at least partially disposed on a first side of a display, is moved relative to the display with a motor disposed on a second side of the display. The second side of the display is opposed to the first side of the display. In another step, the pointer is lit with a lighting element disposed within the motor on the second side of the display. In still another step, light from the pointer is transmitted into a coating disposed on an underside of a lens facing the pointer and the display. The lens is disposed on the first side of the display with the pointer at least partially disposed between the lens and the first side of the display. In yet another step, the transmitted light from the pointer excites the coating, and the coating emits light onto the first side of the display The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
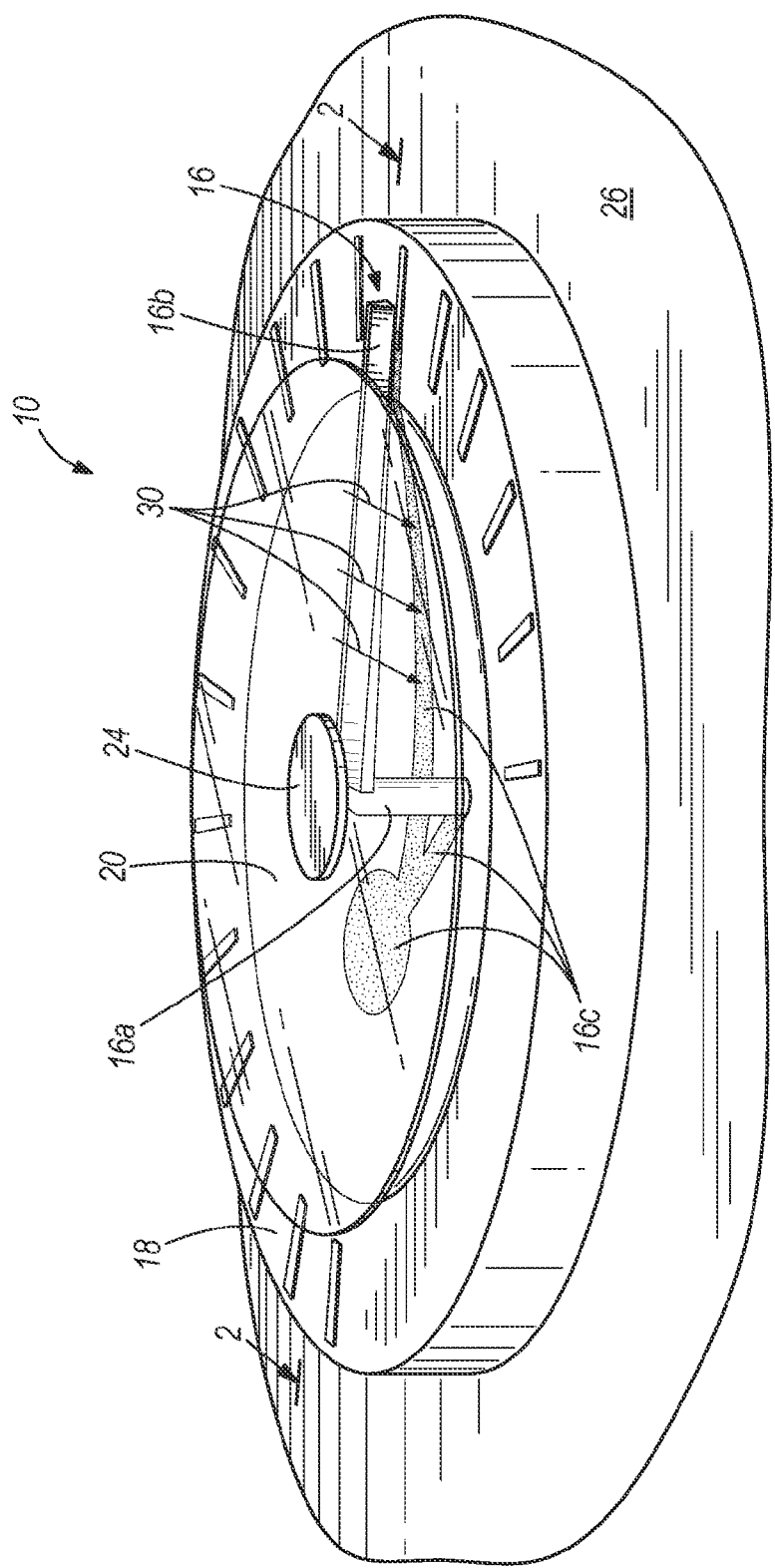
FIG. 1 illustrates a perspective view of one embodiment of a lighting system.
Figure 2:
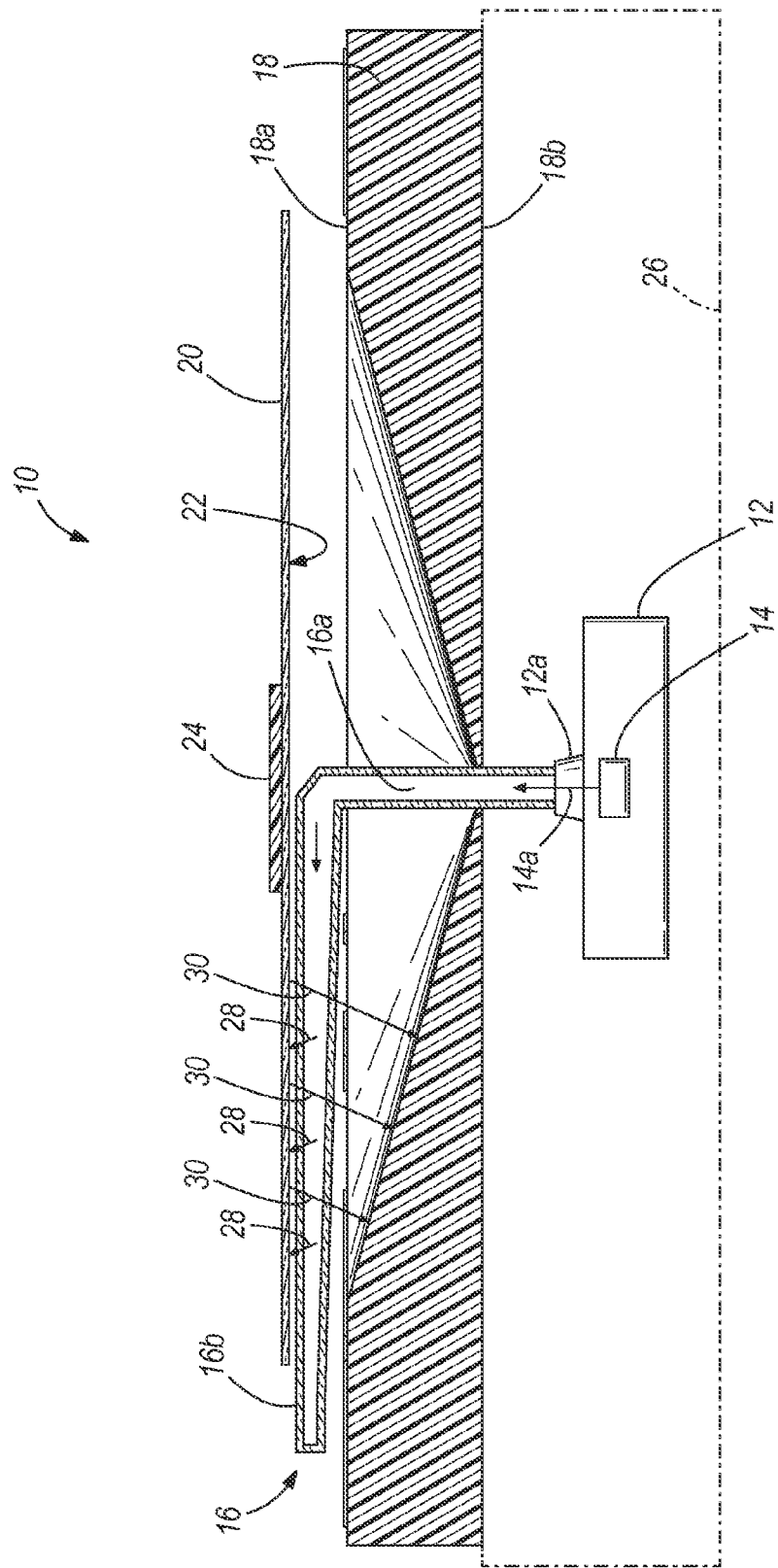
FIG. 2 illustrates a cross-section view through line 2-2 of the lighting system 10 of FIG. 1.

FIG. 1 illustrates a perspective view of one embodiment of a lighting system 10. FIG. 2 illustrates a cross-section view through line 2-2 of the lighting system 10 of FIG. 1. As shown collectively in FIGS. 1 and 2, the lighting system 10 comprises a motor 12, a lighting element 14, a pointer 16, a display 18, a lens 20, a coating 22, and a cap 24. The lighting system 10 may comprise a portion of a vehicle 26 such as an analog instrument cluster gauge. The display 18 may comprise an applique, such as a vehicle gauge display, and may comprise first and second opposed sides 18*a* and 18*b*. The motor 12 may be disposed on the second opposed side 18*b* of the display 18 for moving the pointer 16 relative to the display 18. The motor 12 may comprise a shaftless stepper motor comprising a shaftless portion 12*a*. The shaftless portion 12*a* may comprise an opening.

A hollow shaft 16*a* of the pointer 16 may extend from the first opposed side 18*a* of the display 18, through an opening 18*c* in the display 18 to the second opposed side 18*b* of the display 18, and be attached within and to the shaftless portion 12*a* of the motor 12. In such manner, the motor 12 moves the shaft 16*a* of the pointer 16 thereby moving the pointer dial 16*b*, disposed on the first opposed side 18*a* of the display 18, relative to the display 18. In other embodiments, the motor 12 may move the pointer 16 using other mechanisms such as through magnetism using magnets, or through other connected members disposed between the pointer 16 and the motor 12. The lighting element 14 may be disposed within the shaftless portion 12*a* of the shaftless stepper motor 12 on the second opposed side 18*b* of the display 18 for transmitting light 14*a* to light the shaft 16*a* of the pointer 16 thereby lighting the attached hollow pointer dial 16*b* of the pointer 16. The lighting element 14 may comprise a light-emitting diode or another type of lighting element 14 for lighting the pointer 16.

The lens 20 may be disposed on the first opposed side 18*a* of the display 18. The lens 20 may be transparent. The pointer dial 16*b* of the pointer 16 may be disposed between the first opposed side 18*a* of the display 18 and the lens 20. The cap 24 may be attached to the lens 20 centered over the shaft 16*a* of the pointer 16 on the first opposed side 18*a* of the display 18. The coating 22 is disposed on an underside of the lens 20*a* facing the pointer 16 and the display 18. The coating 22 is made of a material which when excited by light 28 emits light 30 onto the display 18 creating a shadow 16c of the pointer 16 on the display 18. The coating 22 may be made of a material which comprises a decay rate which provides a ghosting effect by creating the trailing moving shadow 16c of the pointer 16 on the display 18. The material of the coating 22 may be chosen to have a certain decay rate to provide the desired amount of ghosting. Preferably, the decay rate is greater than 0 seconds and less than one second. In other embodiments, the decay rate may vary. In one embodiment, the coating 22 is made of Phosphorous. In other embodiments, the coating 22 may be made of any material which provides the desired amount of ghosting.

Figure 3:
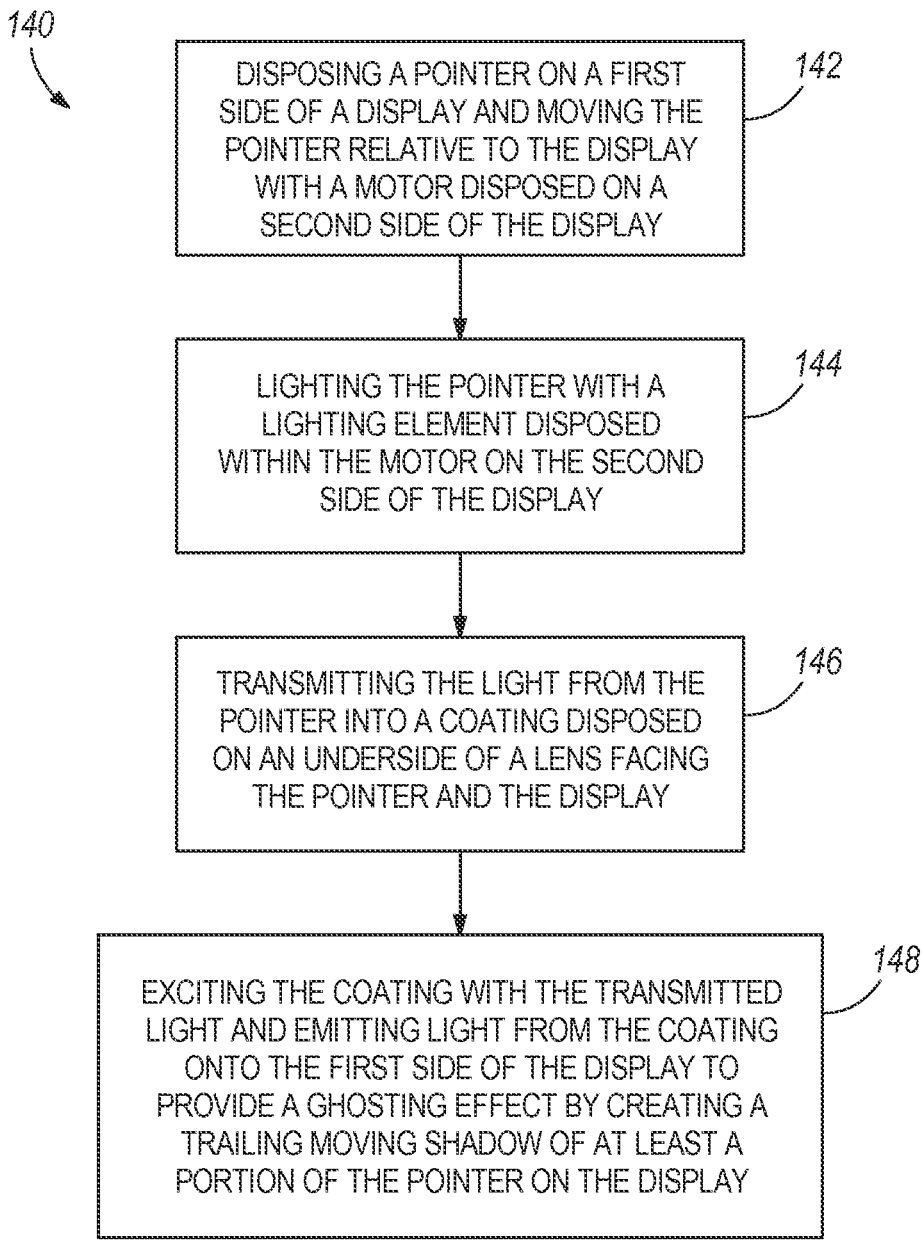
FIG. 3 illustrates a flowchart of one embodiment of a method of lighting a display.

FIG. 3 illustrates a flowchart of one embodiment of a method 140 of lighting a display. The method 140 may utilize any of the embodiments of the system 10 of FIGS. 1 and 2 disclosed herein. In step 142, a pointer at least partially disposed on a first side of a display may be moved relative to the display with a motor disposed on a second side of the display. The display may comprise a portion of a vehicle such as an analog vehicle instrument cluster gauge. In other embodiments, the display may comprise varying types of displays. The second side of the display may be opposed to the first side of the display. The motor may comprise a shaftless stepper motor. In other embodiments, the motor may vary. In step 144, the pointer may be lit with a lighting element disposed within the motor on the second side of the display. The lighting element may comprise a light-emitting diode disposed within a shaftless portion of the shaftless stepper motor.

In step 146, light may be transmitted from the pointer into a coating disposed on an underside of a lens facing the pointer and the display. The lens may be transparent and disposed on the first side of the display with the pointer at least partially disposed between the lens and the first side of the display. In step 148, the coating may be excited with the transmitted light from the pointer, and light may be emitted from the coating onto the first side of the display to provide a ghosting effect by creating a trailing moving shadow of at least a portion of the pointer on the display. The material of the coating may have been chosen based on its decay rate to provide the desired ghosting effect. The coating may be made of Phosphorous or any other type of material having a decay rate to provide the desired ghosting effect. In other embodiments one or more steps of the method 140 may be altered in substance or order, not followed, or one or more additional steps may be followed.

One or more embodiments of the disclosure may reduce one or more issues experienced by one or more current systems or methods by providing a ghosting effect for a pointer of an instrument on a display using an inexpensive coating as opposed to a more expensive and complicated mechanical disc segment system, or other type of system, which is more prone to break down. One or more embodiments of the disclosure may also have additional benefits over one or more other existing systems and methods.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A lighting system comprising:
   a display having first and second opposed sides;
   a pointer at least partially disposed on the first opposed side of the display;
   a motor disposed on the second opposed side of the display for moving the pointer;
   a lighting element disposed within the motor on the second opposed side of the display for lighting the pointer, the motor comprising a shaftless stepper motor and the lighting element being disposed within a shaftless portion of the shaftless stepper motor;
   a lens disposed on the first opposed side of the display with the pointer at least partially disposed between the first opposed side of the display and the lens; and
   a coating disposed on an underside of the lens facing the pointer and the display, wherein the coating is made of a material which when excited by light emits light onto the display creating a shadow of at least a portion of the pointer on the display.

2. The lighting system of claim 1 wherein the lighting system comprises a portion of a vehicle.

3. The lighting system of claim 1 wherein the display comprises an instrument cluster gauge.

4. The lighting system of claim 1 wherein the lighting element comprises a light-emitting diode.

5. The lighting system of claim 1 wherein the lens is transparent.

6. The lighting system of claim 1 wherein the coating comprises Phosphorous.

7. The lighting system of claim 1 wherein the coating comprises a decay rate which provides a ghosting effect by creating a trailing moving shadow of the pointer on the display.

8. A vehicle instrument lighting system comprising:
   a vehicle gauge display having first and second opposed sides;
   a pointer at least partially disposed on the first opposed side of the vehicle gauge display;
   a shaftless stepper motor disposed on the second opposed side of the vehicle gauge display attached to the pointer for moving the pointer;
   a lighting element disposed within the shaftless stepper motor on the second opposed side of the vehicle gauge display for lighting the pointer;
   a lens disposed on the first opposed side of the vehicle gauge display with the pointer at least partially disposed between the first opposed side of the vehicle gauge display and the lens; and
   a coating disposed on an underside of the lens facing the pointer and the vehicle gauge display, wherein the coating is made of a material which when excited by light emits light onto the vehicle gauge display creating a shadow of at least a portion of the pointer on the vehicle gauge display.

9. The vehicle instrument lighting system of claim 8 wherein the lighting element comprises a light-emitting diode.

10. The vehicle instrument lighting system of claim 8 wherein the lens is transparent.

11. The vehicle instrument lighting system of claim 8 wherein the coating comprises Phosphorous.

12. The vehicle instrument lighting system of claim 8 wherein the coating comprises a decay rate which provides a ghosting effect by creating a trailing moving shadow of at least the portion of the pointer on the vehicle gauge display.

13. A method of lighting a display comprising:
   moving a pointer at least partially disposed on a first side of a display relative to the display with a motor disposed on a second side of the display, wherein the second side of the display is opposed to the first side of the display;
   lighting the pointer with a lighting element disposed within the motor on the second side of the display, wherein the motor comprises a shaftless stepper motor and the lighting element is disposed within a shaftless portion of the shaftless stepper motor;
   transmitting light from the pointer into a coating disposed on an underside of a lens facing the pointer and the display, wherein the lens is disposed on the first side of the display with the pointer at least partially disposed between the lens and the first side of the display; and
   exciting the coating with the transmitted light from the pointer and emitting light from the coating onto the first side of the display.

14. The method of claim 13 wherein the display comprises a portion of a vehicle.

15. The method of claim 13 wherein the display comprises an instrument cluster gauge.

16. The method of claim 13 wherein the lighting element comprises a light-emitting diode.

17. The method of claim 13 wherein the lens is transparent.

18. The method of claim 13 wherein the coating comprises Phosphorous.

19. The method of claim 13 further comprising the emitted light, emitted from the coating, providing a ghosting effect by creating a trailing moving shadow of at least a portion of the pointer on the display.

20. The method of claim 19 further comprising a material of the coating being chosen based on its decay rate to provide the desired ghosting effect.

\* \* \* \* \*